(12) United States Patent
Hulbert

(10) Patent No.: US 9,676,423 B2
(45) Date of Patent: Jun. 13, 2017

(54) REAR FLOOR MODULE FOR ARRANGEMENT ON A MOTOR VEHICLE BODY

(71) Applicant: GM GLOBAL TECHNOLOGY OPERATIONS LLC, Detroit, MI (US)

(72) Inventor: Juergen Hulbert, Eltville (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1 day.

(21) Appl. No.: 14/662,733

(22) Filed: Mar. 19, 2015

(65) Prior Publication Data

US 2015/0266515 A1 Sep. 24, 2015

(30) Foreign Application Priority Data

Mar. 22, 2014 (DE) .................. 20 2014 002 557 U

(51) Int. Cl.
*B62D 25/20* (2006.01)
*B60K 15/07* (2006.01)
(Continued)

(52) U.S. Cl.
CPC .......... *B62D 25/2027* (2013.01); *B60K 15/07* (2013.01); *B60Q 1/30* (2013.01); *B60Q 1/34* (2013.01); *B62D 25/087* (2013.01); *B62D 43/10* (2013.01); *H01M 2/1083* (2013.01); *B60K 2015/0638* (2013.01); *H01M 2220/20* (2013.01)

(58) Field of Classification Search
CPC ........ B60K 15/067; B60K 15/07; B60K 1/04; B62D 21/152; B62D 25/087; B62D 25/2027; B62D 43/10; B60R 13/025; B60R 2021/343; B60R 21/34

USPC ...... 296/193.04, 37.2, 187, 187.11; 429/163, 429/186, 187; 180/309, 312, 124.162
See application file for complete search history.

(56) References Cited

U.S. PATENT DOCUMENTS 8,557,436 B2    10/2013   Schwab
8,585,132 B2 *   11/2013   Klimek ................... B60K 1/04
                                                             296/187.08
(Continued)

FOREIGN PATENT DOCUMENTS

CN          201205930 Y      3/2009
CN          103523100 A      1/2014
(Continued)

OTHER PUBLICATIONS

German Patent Office, German Search Report for German Application No. 202014002557.6, dated Dec. 8, 2014.
(Continued)

*Primary Examiner* — Glenn Dayoan
*Assistant Examiner* — Sunsurraye Westbrook
(74) *Attorney, Agent, or Firm* — Lorenz & Kopf LLP

(57) ABSTRACT

A rear floor module for a motor vehicle body is disclosed. The rear floor module includes an upwardly-projecting trough having a floor and a back wall in vehicle vertical direction (z) based on the installation position. The rear floor module is also provided with a fastening structure including at least one fastening point for arranging a motor vehicle component in the trough. Motor vehicle configuration-specific or drive-specific motor vehicle components are arranged in a preconfigured manner on the rear floor module with the fastening structure.

12 Claims, 5 Drawing Sheets

(51) Int. Cl.
*B60Q 1/30* (2006.01)
*B60Q 1/34* (2006.01)
*H01M 2/10* (2006.01)
*B62D 25/08* (2006.01)
*B62D 43/10* (2006.01)
*B60K 15/063* (2006.01)

(56) References Cited

U.S. PATENT DOCUMENTS

| | | | | |
|---|---|---|---|---|
| 8,636,093 B2* | 1/2014 | Sotoyama | ............ | B62D 21/152 180/312 |
| 2007/0040418 A1* | 2/2007 | Ohkuma | ............ | B60K 1/04 297/15 |
| 2008/0315572 A1* | 12/2008 | Hashimura | ............ | B60K 15/063 280/782 |
| 2010/0225135 A1 | 9/2010 | Taneda | | |
| 2011/0156447 A1* | 6/2011 | Matsuoka | ............ | B62D 25/088 296/203.04 |
| 2012/0175914 A1 | 7/2012 | De Luca et al. | | |
| 2014/0292036 A1* | 10/2014 | Kuroda | ............ | B62D 25/14 296/193.07 |

FOREIGN PATENT DOCUMENTS

| | | |
|---|---|---|
| DE | 10348495 A1 | 5/2005 |
| DE | 102005017249 A1 | 5/2006 |
| DE | 102005014925 A1 | 10/2006 |
| DE | 102007041382 A1 | 3/2009 |
| GB | 2486521 A | 6/2012 |
| JP | 2013103691 A | 5/2013 |

OTHER PUBLICATIONS

Great Britain Patent Office, Great Britain Search Report for Great Britain Application No. 1502551.3, dated Jul. 15, 2015.

* cited by examiner

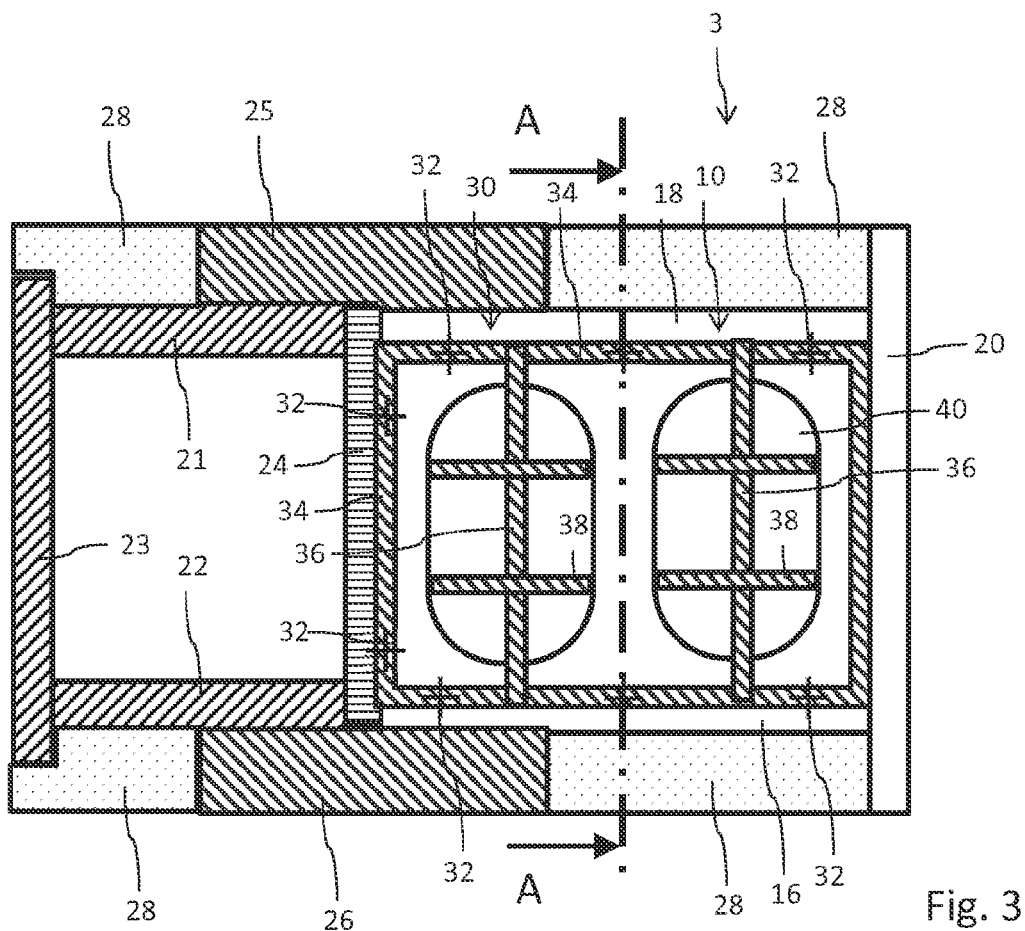
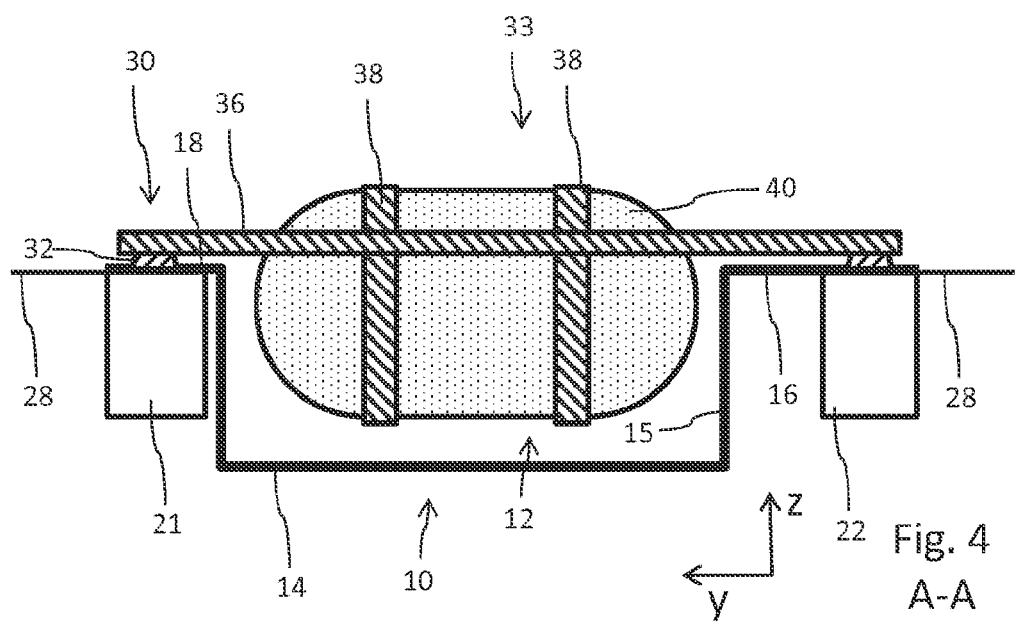

B-B

C-C

REAR FLOOR MODULE FOR ARRANGEMENT ON A MOTOR VEHICLE BODY

CROSS-REFERENCE TO RELATED APPLICATION

This application claims priority to German Patent Application No. 202014002557.6, filed Mar. 22, 2014, which is incorporated herein by reference in its entirety.

TECHNICAL FIELD

The present disclosure pertains to a rear floor module for arrangement on a motor vehicle body. The rear floor module includes at least one trough with a floor and a back wall.

BACKGROUND

Different drive concepts and a plurality of individual configuration possibilities for motor vehicles require the installation of vehicle components which are adapted to the respective configuration and the respective drive concept. Accordingly, corresponding batteries and tanks have to be installed for example for hybrid vehicles or for gas-operated vehicles. Preferred locations of installation for batteries are typically in the floor region, for example in the rear floor region of the motor vehicle body.

Motor vehicles with alternative and in part different drive concepts possibly have to be produced in only a comparatively low production quantity. Therefore, it is desirable to be able to use one and the same unchanged support structure for the different drive concepts and equally also for different motor vehicle configurations. Providing different body support structures, for example for drive concepts based on the one hand for internal combustion engines and on the other hand hybrid drives is comparatively expensive and involved not only in the development but also under assembly and production-related aspects.

DE 10 2005 017 249 A1 discloses a body section, including a rear floor with substantially rectangular form, which has to be arranged in the region of the rear fenders between two rear side members and a rear axle cross member running transversely to the side members. The rear floor in this case is supported as an integrated rear structure module by the two side members and the rear axle cross member. Here, the front region of the rear floor firms a part of the rear axle cross member. The part of the rear axle cross member belonging to the body in white can in this case constitute a shell that is open towards the top, which is complemented by the front part of the rear floor plate into a hollow profile, when the rear floor plate is installed in the body.

SUMMARY

In accordance with the present disclosure a rear floor module for arrangement on a motor vehicle body is provided which makes possible the attachment and the installation of a wide range of motor vehicle components in and on the motor vehicle without having to change the body in white or the support structure of the motor vehicle body or to adapt the drive concept or the motor vehicle configuration. As a result the read floor module achieves lower development, production and assembly costs as well as a reduction in the gross weight of the motor vehicle.

The rear floor module is arranged for a motor vehicle body, and in particular a motor vehicle rear. The rear floor module includes at least one trough having a floor and a back wall, which typically projects upwards, based on the installation position on the motor vehicle in vehicle vertical direction (z). Furthermore, the rear floor module is provided with a fastening structure which includes at least one fastening point for fastening a motor vehicle component that can be arranged in the trough. By means of the fastening structure, motor vehicle configuration-specific or drive-specific motor vehicle components can be arranged preconfigured on the rear floor module.

The rear floor module can be fitted with configuration and/or drive-specific motor vehicle components using the defined fastening structure, and in this respect can be produced as preconfigured assembly independently of the actual production and assembly process of the body in white which is made available for the vehicle final assembly. The rear floor module furthermore includes a connection structure for fastening to the motor vehicle body. With respect to its geometrical configuration, the rear floor module can vary and in each case be structurally and geometrically adapted to its motor vehicle component to be arranged thereon.

The connecting structures of differently configured rear floor modules however are always constant so that each rear floor module of a plurality of differently configured rear floor modules can be fastened in the same manner to the motor vehicle body, in particular to its support structure. Consequently, the support structure and the body in white of the motor vehicle can remain unchanged at least in the rear floor region for any vehicle configuration as well as for any drive concept.

According to a further configuration, the rear floor module includes an insert that can be fastened to the fastening structure, by means of which the motor vehicle component can be fastened to the rear floor module. Typically, the insert includes a fastening structure corresponding to the fastening structure of the rear floor module side for this purpose. The insert can for example be fitted with different motor vehicle components. The insert can also make available motor vehicle component-specific fastening points. The insert can in particular act as a carrier for motor vehicle components to be fastened thereon, so that mechanical fastening of the motor vehicle components that can be arranged in the trough can take place solely via the insert.

Mechanical forces and loads, which originate from the motor vehicle components for example due to gravity can be specifically discharged and transfer into the fastening structure of the rear floor module via the insert. Furthermore, the insert makes possible a module-like production of the rear floor module. For example, the individual motor vehicle components can be initially fastened on the insert to form a preconfigured insert which is fitted and fastened to the rear floor module. Not only the mechanical stability but also the production rational of the rear floor module can be increased by means of the insert.

According to a further configuration, the insert includes a support frame, which can be fastened to multiple fastening points of the fastening structure located outside the trough. Providing a support frame imparts high mechanical strength and stiffness to the insert. Furthermore, the rear floor module by being connected to an insert configured in such a manner can undergo additional reinforcement. Because of the fact that the fastening point for the insert, and consequently for the support frame, are located outside the trough, these can for example come to lie congruently with one or with multiple support structure components of the motor vehicle body, such as for example a side member or cross member.

In this respect, direct or indirect fastening of the insert, and consequently of the motor vehicle component, to the support structure of the motor vehicle can also take place by way of the fastening points provided on the rear floor module. The mechanical loads originating from the motor vehicle components can be exclusively or predominantly introduced and discharged into the support structure of the motor vehicle body in this way. Accordingly, the trough and the back wall of the rear floor module are exposed to only comparatively low mechanical loads. The trough and the back wall accordingly can be designed comparatively thin-walled and thus in a material and weight saving manner.

According to a further configuration, the rear floor module furthermore includes at least one support profile facing away from the back wall and projecting from the trough towards the front. Alternatively or complementarily, the rear floor module can also include at least one and preferably two support profiles laterally projecting from the trough. The fastening points of the fastening structure are typically arranged on the support profile or on the multiple support profiles. The rear floor module can rest on individual support structure components of the motor vehicle body by means of the support profile projecting laterally or towards the front and typically adjoining the trough. The support profile which extends to the front and typically in motor vehicle transverse direction (y) can for example rest on a rear axle cross member while support profiles laterally projecting from the trough can rest on the side members laterally adjoining the trough and running in vehicle longitudinal direction (x).

By means of the support profiles projecting towards the front and/or laterally from the trough, a particularly preassembly of the rear floor module on the motor vehicle body is possible. It can be placed onto the support structure components of the motor vehicle body in a simple manner and for example be at least preassembled by means of positive-locking elements such as for example clips, screws or engagement elements. In addition, a comparatively large support and contact area to adjoining support structure components of the motor vehicle body can also be formed by means of the at least one support profile. This proves to be particularly advantageous for adhesive fastening of the rear floor module to the motor vehicle body.

According to a further configuration, inserts which are differently configured and fitted with different motor vehicle components can be optionally fastened to the fastening structure. Structural and geometrical modifications which are caused by different motor vehicle components can be completely offset via the rear floor module. If for example a hybrid drive is provided, the rear floor module can be fitted with hybrid drive-specific motor vehicle components, while in a different type of motor vehicle configuration, which for example provides a pull-out load carrier or a spare wheel trough, the rear floor module can be fitted with a motor vehicle component configured as a pull-out.

In a further configuration, the rear floor module can be fastened via the fastening structure of the support structure of the motor vehicle body. The fastening structure of the rear floor module in this case fulfils two different functions. On the one hand, the insert can be fastened to the rear floor module with the at least one motor vehicle component arranged thereon in a preassembly configuration, for example for forming a preconfigured assembly. The rear floor module preconfigured in this manner can then be fastened to the motor vehicle body with the same fastening structure, which for example coincides with the connecting structure of the rear floor module. Because of this it can be achieved furthermore that the fastening points on the insert side can be directly or indirectly fastened to the support structure of the motor vehicle body. Mechanical stresses and loads on the trough and the back wall can be kept as low as possible in this manner.

According to a further configuration, the at least one trough and the back wall are designed in one piece. Trough and back wall can be configured as sections of a one-piece molding or casting. Because of this, a separate mutual assembly of trough and back wall is omitted. Because of this, the total number of components for the rear floor module can also be reduced.

According to a further configuration, the rear floor module is formed as a fiber-reinforced plastic body. In this respect, the at least one trough and the back wall form a fiber-reinforced plastic body. The rear floor module can be configured as a fiber composite component. As plastic material, long fiber-reinforced plastics, in particular long fiber-reinforced thermoplastic materials are employed. The reinforcing fibers can be glass fibers, carbon fibers or aramid fibers and combinations formed from these. It is conceivable, furthermore, that fiber-reinforced mats, in particular glass fiber mats, are embedded in the plastic body.

The configuration of the rear floor module in the form of a one-piece plastic body makes possible a weight and cost reduction. Typically, the plastic material should be temperature resistant up to at least 200° C. This makes possible the use of thermally activatable or thermally settable adhesives for the final fastening of the rear floor module to the motor vehicle body. Here it is also conceivable that the rear floor module can be structurally connected to the motor vehicle by means of such adhesives during the course of a painting or drying process.

According to a further configuration, the fastening structure is integrated in the plastic body. The fastening points of the fastening structure can for example be designed as fastening domes, which for example protrude from or out of the surface of the support profiles. In this respect, the fastening points can provide defined support points for the insert or for the support frame of the same. The fastening points can also be stiffened and thus structurally reinforced locally for example by means of metal inserts or by means of a suitable fiber-reinforcement.

According to a further configuration, the at least one motor vehicle component that can be arranged on the rear floor module in a preconfigured manner is configured as an electric energy storage device, a liquid or gas tank. The motor vehicle component can for example be configured as a battery, as a hybrid battery, as a range extender, as a tank for liquefied petroleum gas (LPG), for liquid gas or as a tank for compressed natural gas (CNG). The motor vehicle component can furthermore be designed as a loudspeaker, for example as a Hi-Fi subwoofer, as amplifier or as final stage. It is conceivable, furthermore, that the trough acts as spare wheel trough, so that the motor vehicle component constitutes a spare wheel.

Furthermore, different motor vehicle components for example in the form of a hybrid or auxiliary battery can be configured together with a further trough for example for receiving a spare wheel on one and the same rear floor module.

In a further embodiment, the motor vehicle component is configured as a pull-out, which by means of at least one guide rail of the insert can be transferred through a lockable recess of the rear wall into a pulled-out position. The motor vehicle component in this case is fastened on the insert via the guide rail and consequently arranged on the rear floor module via the insert. Typically, the motor vehicle component, consequently the pull-out, is displaceably or longitudinally displaceably mounted in vehicle longitudinal direction (X) on the insert and thus on the rear floor module via at least two guide rails arranged laterally of the pull-out. The pull-out can act in the manner of a drawer as a pull-out load carrier. By the rear wall of the rear floor module having a recess or passage opening corresponding to the geometry of the pull-out, the pull-out can be passed through the rear wall so that it protrudes for example from the tail of the motor vehicle in its pulled-out position.

It is conceivable furthermore that the rear floor module is fitted both with a pull-out as well as with an energy storage device. It is conceivable, furthermore, that the rear floor module includes multiple troughs which for example are separated from one another by a cross member section or a side member section. A trough in this case can for example serve for receiving an energy storage device while another trough can provide stowage space.

According to a further configuration, at least one tail lamp is arranged on the back wall. Insofar, the rear floor module can be fitted with a tail lamp even before its installation in the motor vehicle body, so that separate assembly of the tail lamp, which typically includes brake light, turn signal indicator and if appropriate back-up lamp, can be advantageously omitted for the final motor vehicle assembly.

Finally, in a further aspect, a motor vehicle body with a rear floor module described above is provided. The motor vehicle body is typically configured as a self-supporting motor vehicle body. It includes a support structure in the floor region for example formed by side members and cross members, on which the rear floor module with motor vehicle components arranged thereon in a preconfigured manner, can be fastened. The rear floor module typically configured as plastic body can be connected to the support structure of the motor vehicle body in a materially-joined manner for example by gluing, but also by means of other connecting techniques such as for example screwing or riveting as well as by means of clinching.

Accordingly, in a further configuration, it is provided that the rear floor module in vehicle longitudinal direction (x) can be pushed into a region located between rear side members of the support structure of the body and can be connected to the support structure of the body via the fastening structure. The width of the trough of the rear floor module extending in vehicle transverse direction (y) corresponds to or is smaller than the clear distance between the lateral rear-end side members of the motor vehicle body running in vehicle longitudinal direction. In this way, the rear floor module with its laterally projecting support profiles resting on the side members can for example be pushed in from the back towards the front between the side members opposite to the travelling direction of the motor vehicle. For the assembly of the rear floor module on the motor vehicle body, no lifting of the motor vehicle body is required in this respect, which substantially simplifies the assembly and fastening process and results in cost savings.

Finally, according to a further aspect, a motor vehicle is provided which includes a previously described rear floor module or a previously described motor vehicle body.

BRIEF DESCRIPTION OF THE DRAWINGS

The present disclosure will hereinafter be described in conjunction with the Wowing drawing figures, wherein like numerals denote like elements.

FIG. 3 a top view from above onto a rear floor module according to a first embodiment arranged on the motor vehicle body;

FIG. 4 a cross section along A-A according to FIG. 3;

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description.

Figure 1:
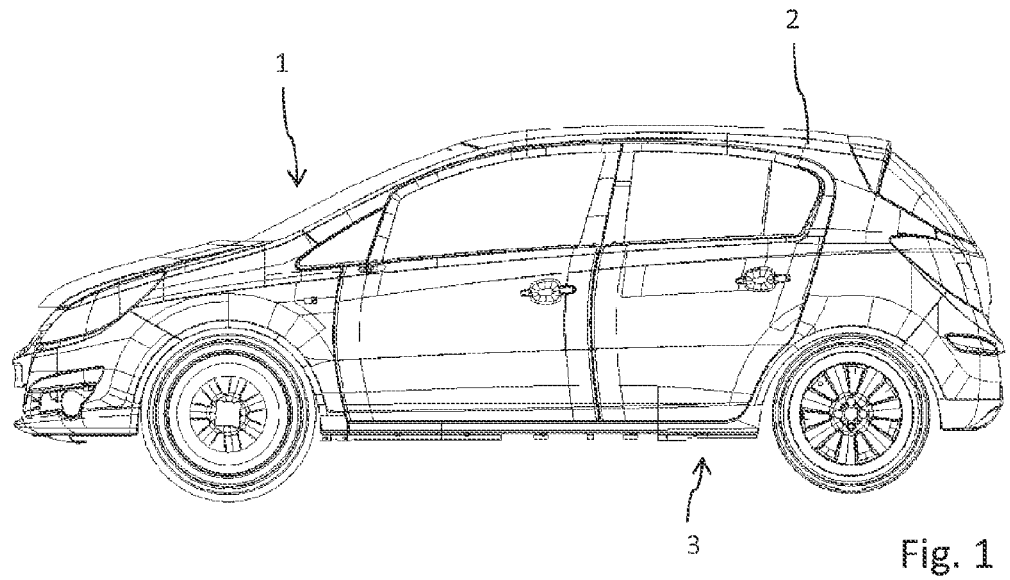
FIG. 1 a lateral view of a motor vehicle.

In FIG. 1, a motor vehicle 1 configured as a passenger car is shown in lateral view. The motor vehicle 1 includes a self-supporting motor vehicle body 2 with a support structure 3. As is exemplarily indicated in FIG. 3, the support structure 3 includes two longitudinally extending side members 21, 22 which are structurally connected to one another via cross members 23, 24 which are spaced from one another in motor vehicle longitudinal direction (x). The side members 21, 22 typically extend as far as to the vehicle rear, i.e. they extend backwards, opposite to the travelling direction of the motor vehicle, beyond the cross member 24 configured as axle cross member.

Figure 2:
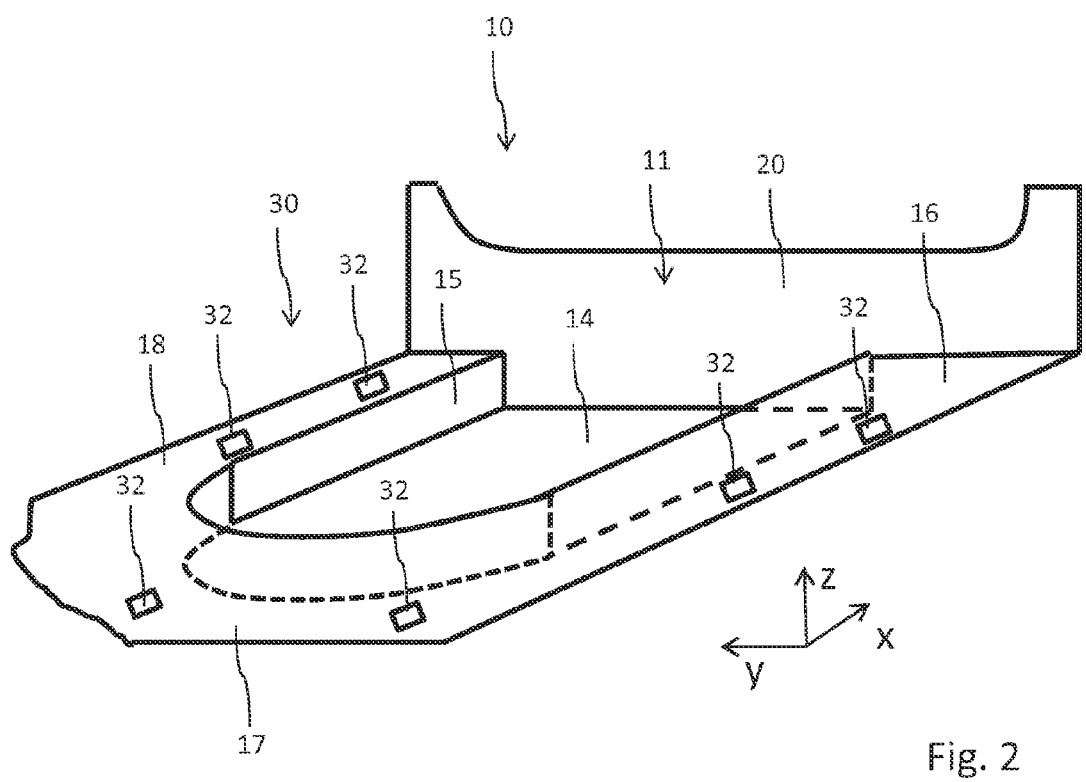
FIG. 2 a schematic perspective representation of a rear floor module.

Outside the side members 21, 22, the motor vehicle 2 includes a right and left wheel housing 25, 26. In travelling direction in front of and behind the wheel housings 25, 26, floor plate sections 28 are arranged between the side members 21, 22 and side walls (not shown) laterally spaced therefrom. Between the side members 21, 22, a rear floor module 10 can be arranged, which in FIG. 2 is shown isolated and in a perspective view. The rear floor module 10 includes a one-piece plastic body 11, which is typically fiber-reinforced.

The plastic body 11 can, in particular, be long fiber-reinforced. It is also conceivable that the plastic body 11 is at least locally reinforced with fiber mats. Furthermore, the plastic body 11 can be configured reinforcement-profiled at least in sections. It is conceivable that individual part regions of the plastic body for example include ribs or a hexagonal reinforcing structure. The rear floor module 10 furthermore includes a trough 12 configured as receiving depression, which is bounded laterally and towards the front by lateral cheeks 15. The rear floor module 10 furthermore includes a back wall 20, which typically extends in the plane formed by vehicle vertical axis (z) and vehicle transverse direction (y).

The back wall 20 can be incorporated surface-flush in the outer paneling of the motor vehicle in the final assembly configuration on the motor vehicle 1. Towards the top, the back wall 20 can for example bound a trunk or tail aperture towards the bottom or contribute to the loading edge of a tail or trunk aperture or form the same. The back wall 20 can also bound the trough 12 towards the back towards the vehicle rear. In the region of the trough 12, the rear floor module has a floor 14 which is typically configured flat, which serves as insert for a floor plate.

The rear floor module 10 furthermore includes support profiles 16, 17, 18 adjoining the lateral cheeks 15 of the trough 12 projecting towards the outside and towards the front. Here, the support profiles 16, 17, 18 are configured in one piece and in a manner of speaking configured as an assembly rim protruding towards the outside and enclosing the trough 12. For the final assembly of the rear floor module 10 on the support structure 3 of the motor vehicle body it is provided in particular that the support profile 16, 18 projecting towards the left and towards the right and resting on the associated left and right side members 22, 21 can be pushed on from the back towards the front in vehicle longitudinal direction (x). For the final assembly of the rear floor module 10, lifting of the motor vehicle body 2 is thus not required. The support profile 17 projecting towards the front can rest on the cross member 24 on reaching the final assembly configuration shown in FIG. 3.

In the region of the support profiles 16, 17, 18, the rear floor module 10 has a fastening structure 30 for arrangement and fastening of at least one motor vehicle component 40, 42, 44, 50 that can be arranged in the trough 12. The fastening structure 30 in particular includes multiple fastening points 32 which are distributed over the support profiles 16, 17, 18, by means of which a wide range of motor vehicle components 40, 42, 44, 50 can be fastened to the rear floor module 10 in a preconfigured manner. By arranging a wide range of motor vehicle components 40, 42, 44, 50 on the rear floor module 10, a preconfigured assembly can be formed in this respect, which can be arranged and fastened as a whole to the support structure 3 during the final motor vehicle assembly.

The fastening structure 30 for the pre-configurable fastening of motor vehicle components 40, 42, 44, 50 on the rear floor module 10 can typically coincide with a connecting structure of the rear floor module 10. By means of the connecting structure, the rear floor module 10 can be fastened to the support structure 3 of the motor vehicle body 2. In other words, the fastening points 32 of the fastening structure 30 have a dual function. On the one hand, the various motor vehicle components 40, 42, 44, 50 can be fastened to the rear floor module 10 via the fastening points 32. The rear floor module 10 that is preconfigured in this respect can furthermore be fastened together with the motor vehicle component 40, 42, 44, 50 concerned to the support structure 3 via the same fastening points 32.

As is shown in the exemplary embodiment of FIGS. 3 and 4, the rear floor module 10 can be configured for receiving an insert 33. The insert 33 in this case includes a surrounding support frame 34 with two cross members 36. On the cross members 36 in turn a support corset 38 is arranged, which for example serves for receiving and fastening a motor vehicle component 40 configured as a tank.

By way of and by means of the support frame 34, the motor vehicle component 40 configured as an energy storage device can be held and arranged quasi-suspended in the trough 12 so that the trough 12 itself is not exposed to any or only minor mechanical loads. The weight force of the energy storage device 40 is discharged via the support frame 34 into the fastening points 32 of the fastening structure 30 of the rear floor module 10. As is shown in FIG. 4, the fastening points 32 of the rear floor module 10 are directly located above the side member 21, 22, so that the weight force of the motor vehicle component 40 can be directly or indirectly transmitted to the support structure 3 of the motor vehicle body 2. The trough 12 in this respect can be configured comparatively thin-walled, in a weight and cost saving manner.

Figure 5:
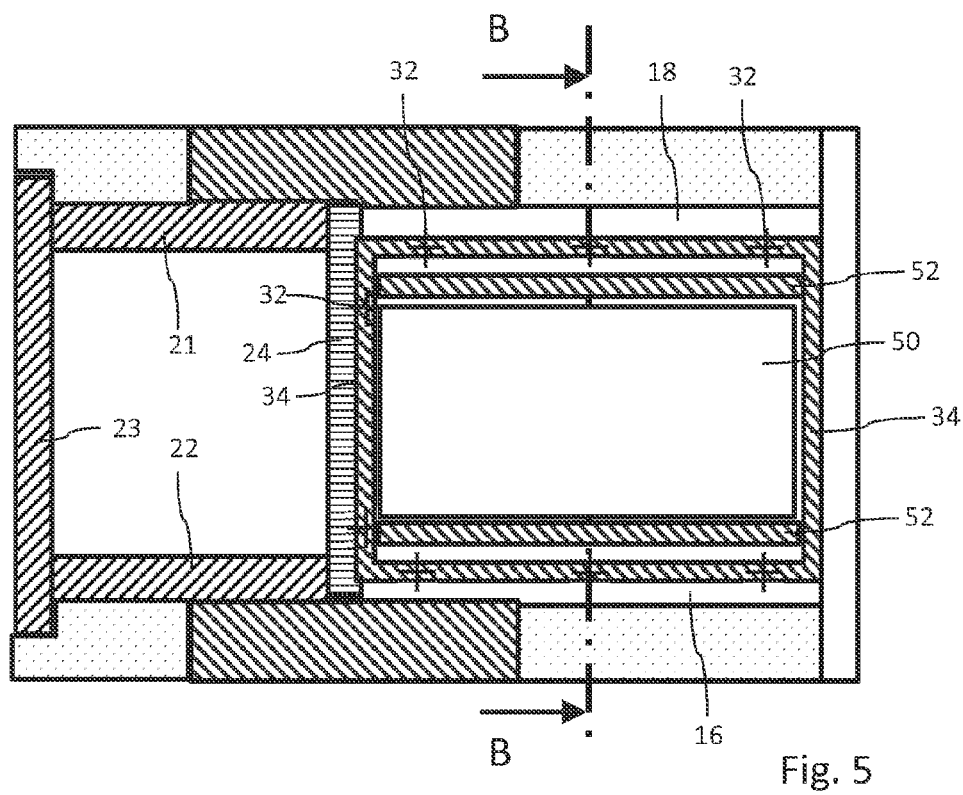
FIG. 5 a top view from the top onto a second configuration of a rear floor module arranged on the motor vehicle body.
Figure 6:
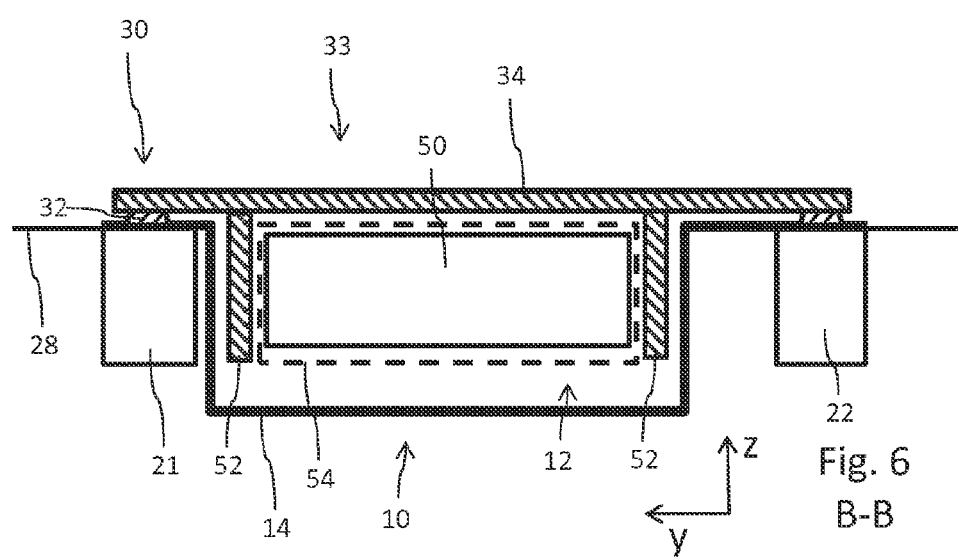
FIG. 6 a cross section along B-B according to FIG. 5.

FIGS. 5 and 6 shows a further configuration of the rear floor module 10. In this embodiment, a similar or identical trough 12 and a support frame 34 which is comparable to or identical with FIG. 3 is provided. On the support frame 34 however guide rails 52 which are laterally extended longitudinally and projecting downwards into the trough are arranged, between and on which a motor vehicle component 50 configured as pull-out is displaceably mounted in longitudinal direction. The back wall 20 for this purpose includes a lockable recess 54, through which the motor vehicle component 50 acting as drawer can be transferred into a pulled-out position projecting from the vehicle tail.

Instead of a drawer-like pull-out 50, the motor vehicle component 50 concerned can for example be configured also as a pull-out load carrier, in particular as a bicycle or generally a two-wheel vehicle carrier.

Figure 7:
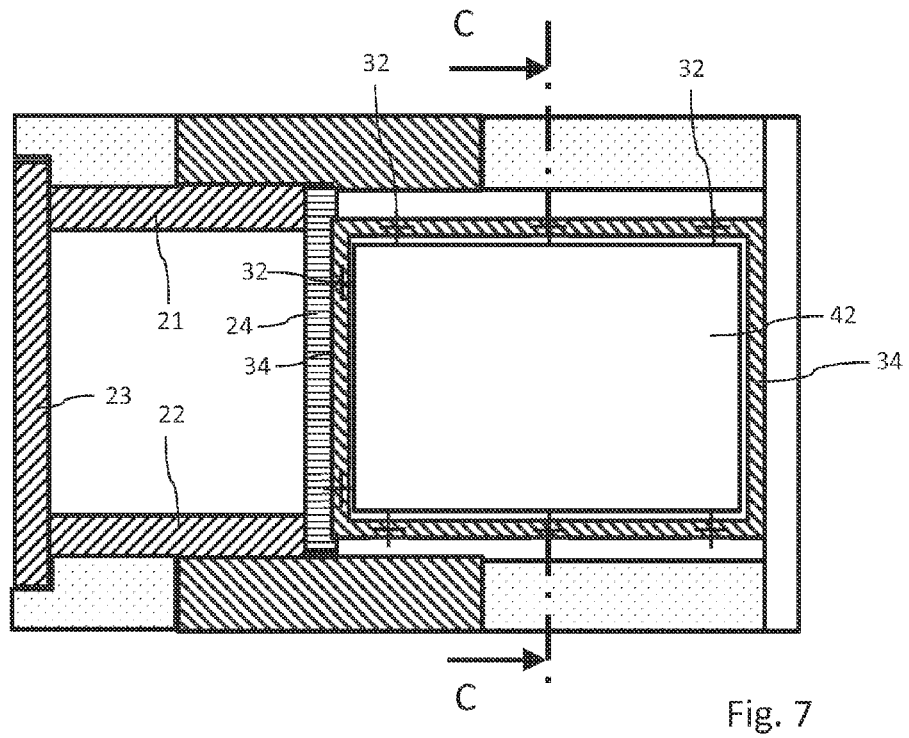
FIG. 7 a further configuration of a rear floor module arranged on the motor vehicle body in a top view from above.
Figure 8:
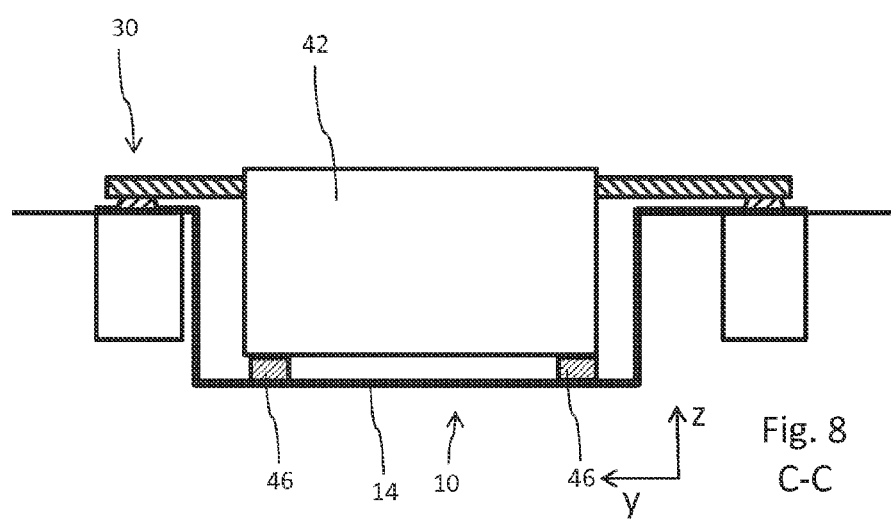
FIG. 8 a cross section along C-C according to FIG. 7.

In a further embodiment shown in FIGS. 7 and 8 the rear floor module 10 is fitted with an insert 33 likewise including a support frame 34. In contrast with the two previously described configurations, the motor vehicle component 42 in this case is configured as a comparatively large battery which fills out almost the entire internal volume of the trough 12. Here it is also provided that the weight force of the motor vehicle component 42 can be predominantly transmitted via the support frame 34 via the various fastening points 32 directly onto the side members 21, 22 and/or onto the cross member 24.

In addition to this, one or multiple spacing elements 46 can be arranged in the intermediate space between a floor of the motor vehicle component 42 and the floor 14 of the trough 12, via which at least a part of the weight force of the motor vehicle component 42 can also be transmitted to the trough 12. In this way, mechanical loads can be transmitted to the support structure 3 of the motor vehicle body both via the support frame 34 and the insert 33 as well as via the trough 12 which is typically configured in a fiber-reinforced manner.

Figure 9:
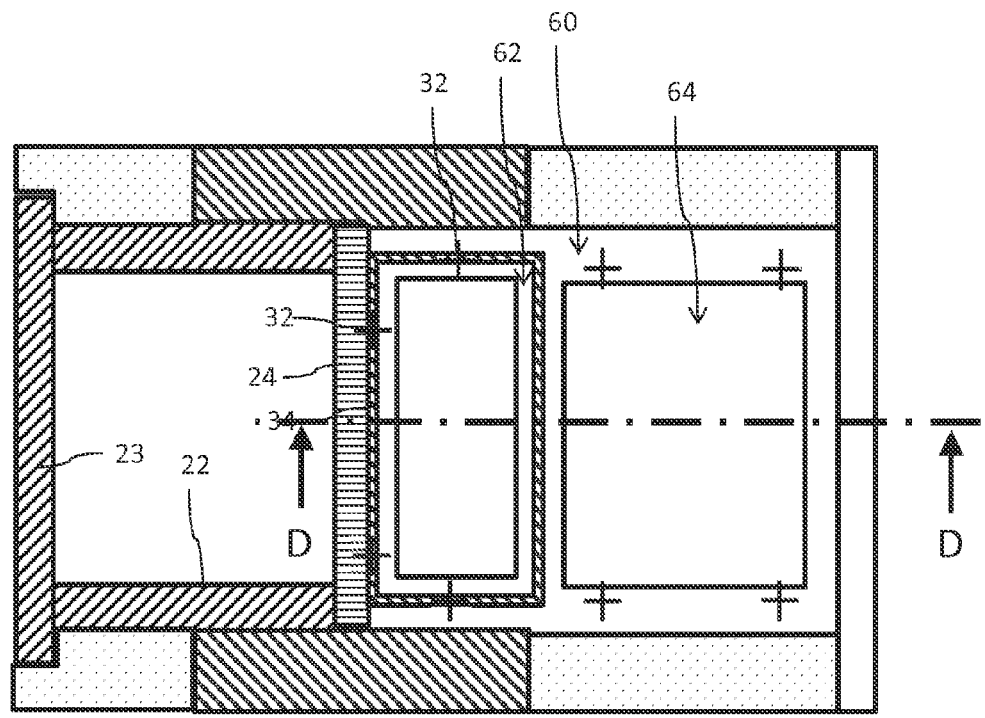
FIG. 9 a further embodiment of the rear floor module in top view from above.
Figure 10:
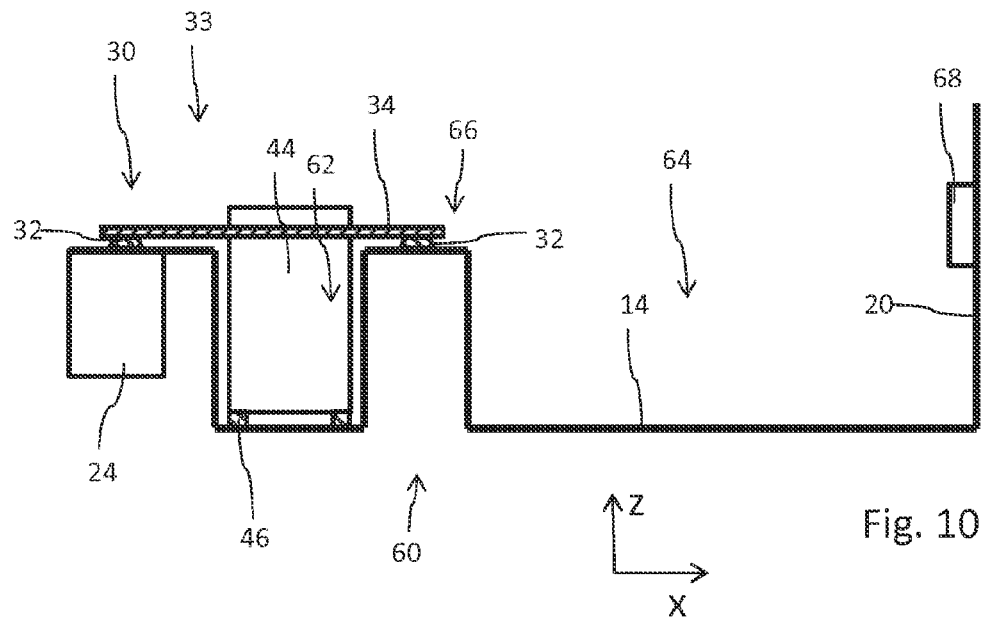
FIG. 10 a cross section along C-D according to FIG. 9.

FIGS. 9 and 10 show a further configuration of the rear floor module 60. The rear floor module 60 in contrast with the rear floor modules of FIGS. 2 to 8 includes two troughs 62, 64, which are separated from one another via a support section 66. Here, the trough 62 is configured as a front trough, while the trough 64 is designed as a rear trough spaced therefrom in vehicle longitudinal direction (x). Opposite to the travelling direction of the motor vehicle 1, the trough 64 is bounded by the back wall 20. On the back wall 20, for example a back lamp 68 can be arranged in a preconfigured manner.

The front trough 62 in this case can serve for receiving a comparatively minor and accordingly small-dimensioned motor vehicle component 44. This can for example be configured as a hybrid battery. Similar to the configuration shown in FIG. 8, the motor vehicle component 44 can be fastened to the plastic body 11 of the rear floor module 10 via a support frame 44 and an insert 33. Corresponding fastening points 32 can also be located for example above the cross member 24 of the support structure 3 in this case, so that direct or indirect discharge of mechanical forces into the support structure is also provided here.

The support section 66 of the rear floor module 60 can be typically provided with a structural reinforcement. This can be structurally stiffened either by a suitable stiffened configuration of the plastic body 11 or by embedding fiber mats and/or structurally reinforced metal inserts, so that adequately stable and torsionally rigid fastening and assembly is provided for the support frame 34.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A rear floor module for arrangement on a vehicle support structure of a motor vehicle comprising:
a body having a floor and a back wall defining at least one trough therein, the back wall projects upwardly in a vertical direction and cooperates to form a loading edge of a trunk aperture, the back wall bounds the at least one trough and the back wall is opposite a traveling direction of the motor vehicle;
at least one tail lamp arranged on the back wall; and
a fastening structure having at least one fastening point configured to fasten a vehicle component to the body such that at least a portion of the vehicle component is arranged in the at least one trough,
wherein the at least one trough and the back wall are formed in one piece, the at least one trough comprises a front trough and a rear trough, the rear trough bounded by the back wall and the front trough spaced apart from the rear trough in a vehicle longitudinal direction by a support section, the front trough receives a battery associated with the motor vehicle and the second trough provides a stowage space.

2. The rear floor module according to claim 1, further comprising an insert fastened to the fastening structure, wherein the vehicle component is fastened to the rear floor module.

3. The rear floor module according to claim 2, wherein the insert comprises a support frame fastened at a plurality of fastening points of the fastening structure located outside the at least one trough.

4. The rear floor module according to claim 2, further comprising a plurality of inserts, each insert configured to fit with different motor vehicle components and be optionally fastened to the fastening structure.

5. The rear floor module claim 1, further comprising a first support profile facing away from the back wall and projecting from the at least one trough towards a second support profile laterally projecting from the at least one trough and on which the at least one fastening point is arranged.

6. The rear floor module according to claim 1, wherein the body is fastened to a support structure of the motor vehicle via the fastening structure.

7. The rear floor module according to claim 1, wherein the at least one trough and the back wall form a fiber-reinforced plastic body.

8. The rear floor module according to claim 7, wherein the fastening structure is integrated in the plastic body.

9. The rear floor module according to claim 1, further comprising at least one guide rail disposed on the insert which is transferred through a lockable recess of the back wall into a pulled-out position, wherein the vehicle component is configured as a pull-out.

10. A motor vehicle body with a rear floor module according to claim 1.

11. The motor vehicle body according to claim 10, wherein the rear floor module is fitted with the vehicle component which is pushed in vehicle longitudinal direction into a region located between rear side members of the support structure of the body, wherein the vehicle component is secured to support structure by the fastening structure.

12. A motor vehicle having a motor vehicle body according to claim 10.

* * * * *